United States Patent
Steingass et al.

(10) Patent No.: US 10,247,176 B2
(45) Date of Patent: Apr. 2, 2019

(54) DEVICE FOR CHOKING A FLUID FLOW AND CORRESPONDING PISTON PUMP FOR DELIVERING FLUIDS

(71) Applicant: Robert Bosch GmbH, Stuttgart (DE)

(72) Inventors: Stephan Steingass, Bornheim (DE); Oliver Gaertner, Abstatt (DE); Oliver Hennig, Obersulm (DE); Vaclav Kocourek, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 600 days.

(21) Appl. No.: 14/933,850

(22) Filed: Nov. 5, 2015

(65) Prior Publication Data
US 2016/0131121 A1   May 12, 2016

(30) Foreign Application Priority Data
Nov. 6, 2014   (DE) .......................... 10 2014 222 741

(51) Int. Cl.
| | |
|---|---|
| *F04B 1/04* | (2006.01) |
| *F04B 11/00* | (2006.01) |
| *B60T 8/40* | (2006.01) |
| *F04B 53/10* | (2006.01) |

(52) U.S. Cl.
CPC .......... *F04B 1/0461* (2013.01); *F04B 1/0404* (2013.01); *F04B 1/0452* (2013.01); *F04B 1/0456* (2013.01); *F04B 11/0091* (2013.01); *F04B 53/10* (2013.01); *B60T 8/4031* (2013.01); *F04B 53/108* (2013.01); *Y10T 137/7744* (2015.04); *Y10T 137/7847* (2015.04)

(58) Field of Classification Search
CPC .... F04B 1/0404; F04B 1/0452; F04B 1/0461; F04B 11/0091; B60T 8/4031; B60T 8/40; Y10T 137/7744; Y10T 137/7847
USPC .......................................................... 417/273
See application file for complete search history.

(56) References Cited

U.S. PATENT DOCUMENTS

| | | | | |
|---|---|---|---|---|
| 2,318,962 A | * | 5/1943 | Parker ................... | F16K 15/026 137/513.3 |
| 3,149,643 A | * | 9/1964 | Breitsprecher ......... | F16K 17/04 137/469 |
| 4,000,684 A | * | 1/1977 | Ruffley ................. | F15B 11/068 91/447 |
| 5,722,738 A | * | 3/1998 | Beck ...................... | B60T 8/4031 303/116.1 |

FOREIGN PATENT DOCUMENTS

| | | |
|---|---|---|
| DE | 253 657 A1 | 1/1988 |
| DE | 601 03 896 T2 | 5/2005 |
| DE | 10 2011 079 876 A1 | 1/2013 |

* cited by examiner

*Primary Examiner* — Peter J Bertheaud
(74) *Attorney, Agent, or Firm* — Maginot, Moore & Beck LLP

(57) ABSTRACT

A device for choking a fluid flow, with a pot-like base body, in the base of which a first passage opening is arranged, and a closing body guided axially moveably in the pot-like base body against a spring force of a spring element and having a second passage opening that forms a static choke point with a predefined fixed opening cross section. The closing body in combination with the spring element and the first passage opening forms a dynamic choke point with a dynamic opening cross section that is variably adjustable depending on a pressure difference.

7 Claims, 3 Drawing Sheets

DEVICE FOR CHOKING A FLUID FLOW AND CORRESPONDING PISTON PUMP FOR DELIVERING FLUIDS

This application claims priority under 35 U.S.C. § 119 to patent application no. DE 10 2014 222 741.0, filed on Nov. 6, 2014 in Germany, the disclosure of which is incorporated herein by reference in its entirety.

The disclosure is based on a device for choking a fluid flow and a piston pump for delivering fluids with such a choke device.

BACKGROUND

Piston pumps for delivering pressure media in hydraulic brake systems with ABS and/or ESP functionality (ABS: antilock braking system, ESP: electronic stability program) are known from the prior art in various embodiments. For example, in vehicle brake systems, often radial piston pumps are used with a plurality of pump elements for delivering pressure media, in which at least one piston can be moved to and fro by means of an eccentric. Typically, these so-called pump elements consist of a piston, a piston running face normally formed as a cylinder, inlet and outlet valves, and sealing elements. The valves serve to control the fluid on the pumping movement of the piston. The inlet valve here serves to prevent the fluid from flowing back into the intake chamber during the compression phase, the outlet valve prevents the fluid from flowing back from the pressure side into the pump interior. Also, downstream of the outlet valve of the piston pump, a choke device is provided with a static and a dynamic choke point which open and close depending on the flow quantity or the resulting flow differences. The static choke point brings advantages in the NVH performance (NVH: noise, vibration, harshness) of the piston pump, but also disadvantages in relation to the maximum possible volume flow since after each pump stroke, the dynamic choke point closes again and the volume must flow through the integrated static choke point. This can lead to losses in the pressure build-up performance.

Publication DE 10 2011 079 876 A1 describes for example a piston pump for delivering fluids in a hydraulic vehicle brake system. The piston pump described comprises a cylinder, a piston mounted moveably in the cylinder, and a pressure chamber arranged between an inlet valve and an exhaust valve. The pressure chamber is closed by a cover. Downstream of the outlet valve in the fluid flow, a choke element which is configured as a spring-elastic disk is provided for choking the fluid flow. The spring-elastic disk is placed in the cover, wherein centering means are present in the cover which cause a pre-centering of the choke element in the cover. The piston pump described comprises a first choke point with a passage which is cleared independently of a differential pressure and has a defined constant flow cross section, and a second choke point with a passage which is cleared depending on a differential pressure and has a dynamic flow cross section depending on the differential pressure.

SUMMARY

The device according to the disclosure for choking a fluid flow for a vehicle, in contrast has the advantage that the maximum flow rate can economically be increased at high engine speeds with unchanged NVH performance at low engine speeds.

The core of the disclosure lies in the integration of a targeted inertia in the closing body. In this way the closing behavior of the dynamic choke point can be delayed. Due to the delayed closing behavior of the dynamic choke point, after a few pump strokes the static choke is disabled. The integrated inertia of the valve can be achieved via a deliberately integrated, direction-dependent friction or via an elastomer spring. The integrated inertia prevents rapid closure of the dynamic choke point. The resulting closing behavior is governed by a hysteresis, and the closure of the dynamic choke point is offset in time.

Embodiments of the present disclosure propose a device for choking a fluid flow with a pot-like base body, in the base of which a first passage opening is arranged, and a closing body guided axially moveably in the pot-like base body against the spring force of a spring element and having a second passage opening that forms a static choke point with a predefined fixed opening cross section. In combination with the spring element and the first passage opening, the closing body forms the dynamic choke point with a dynamic opening cross section that is variably adjustable depending on a pressure difference. According to the disclosure, a delay device is provided which delays the closing movement of the closing body in a targeted fashion.

Also a piston pump is proposed for delivering fluids which comprises a piston, a pump cylinder and a pressure chamber arranged between an inlet valve and an outlet valve. Means for choking the fluid flow are provided downstream of the outlet valve in the fluid flow, which are configured as a device for choking a fluid flow according to the disclosure.

It is particularly advantageous that the delay device may have a friction element with a lip which is arranged between the closing body and an inner wall of the pot-like base body and may create a direction-dependent friction. The friction element may for example thus be arranged in a receiver in the closing body or be molded onto the closing body, such that the lip of the friction element can be guided on the inner wall of the pot-like base body. In the embodiment of the closing body as a plastic injection molding, the direction-dependent friction element may advantageously even be integrated directly in the injection molding with neutral cost effect. Also the friction element may have a lower friction value in the opening direction of the closing body and a higher friction value in the closing direction of the closing body.

In an alternative embodiment of the device according to the disclosure, the delay device may comprise a spring element configured as an elastomer spring. In this embodiment, the delay of the closing movement of the closing body can easily be predefined by a suitable choice of material and/or geometry for the elastomer spring.

In an advantageous embodiment of the piston pump according to the disclosure, the delay device may be configured such that in a first operating mode of the piston pump, the static choke point is disabled after a predefined number of pump strokes and bridged by a bypass formed by the dynamic choke point. Also, the delay device may be configured such that in a second operating mode, the static choke point is enabled and causes a pressure-independent choking of the fluid flow. The piston pump preferably has a higher flow rate in the first operating mode and a lower flow rate in the second operating mode.

Exemplary embodiments of the disclosure are shown in the drawings and described in more detail in the description

DETAILED DESCRIPTION

Figure 1:
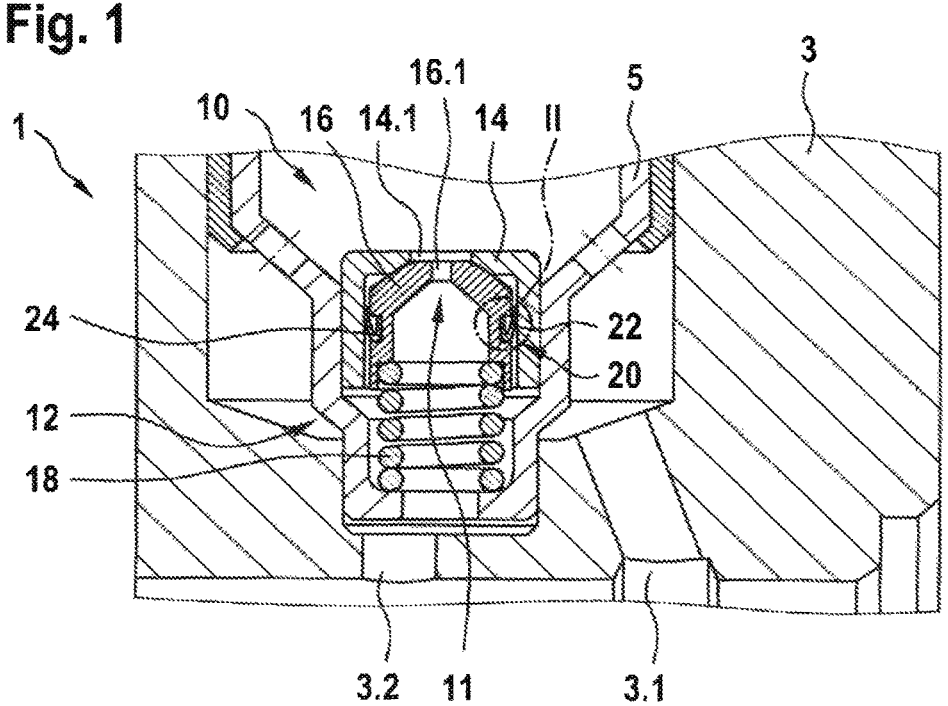
FIG. 1 shows a diagrammatic cross-section view of an extract of a first exemplary embodiment of a piston pump according to the disclosure for delivering fluids, with a first exemplary embodiment of a device according to the disclosure for choking a fluid flow.
Figure 2:
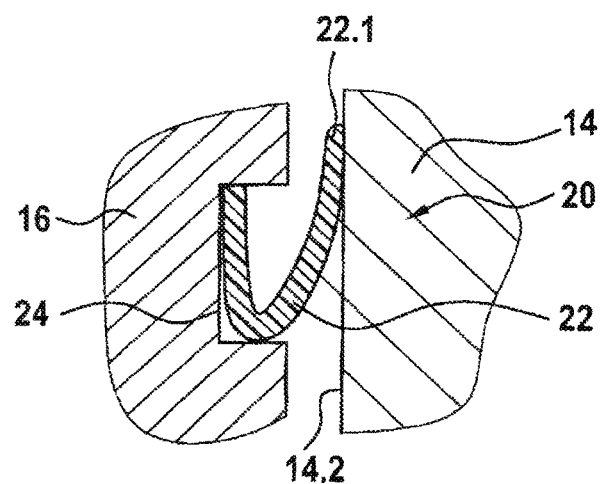
FIG. 2 shows a diagrammatic detailed drawing of the piston pump according to the disclosure for delivering fluids from FIG. 1.
Figure 3:
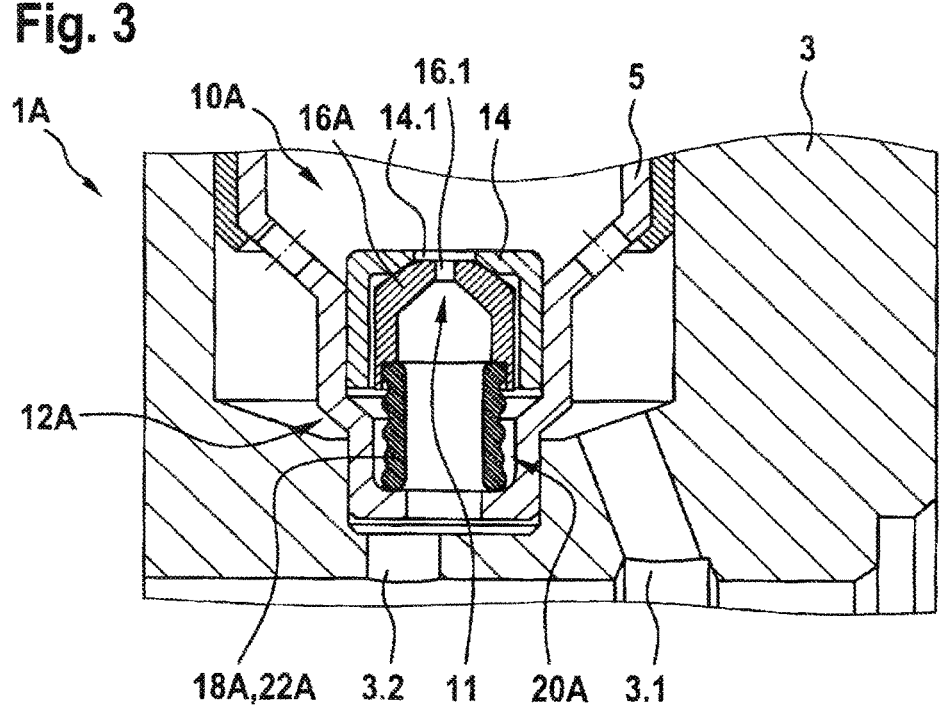
FIG. 3 shows a diagrammatic cross-section view of an extract of a second exemplary embodiment of a piston pump according to the disclosure for delivering fluids, with a second exemplary embodiment of a device according to the disclosure for choking a fluid flow.

As evident from FIGS. 1 to 3, the exemplary embodiments shown of a device 10, 10A according to the disclosure for choking a fluid flow comprise a pot-like base body 14, in the base of which a first passage opening 14.1 is arranged, and a closing body 16, 16A guided axially moveably in the pot-like base body 14 against the spring force of a spring element 18, 18A and having a second passage opening 16.1 that forms a static choke point 11 with a predefined fixed opening cross section. The closing body 16, 16A in combination with the spring element 18, 18A and the first passage opening 14.1 here forms a dynamic choke point 12, 12A with a dynamic opening cross section which is variably adjustable depending on a pressure difference. According to the disclosure, a delay device 20, 20A is provided which delays the closing movement of the closing body 16, 16A in a targeted fashion.

Embodiments of the choke device 10, 10A of a fluid flow according to the disclosure are used in the exemplary embodiments shown in a piston pump 1, 1A for delivering fluids which comprises a piston, a pump cylinder 5 and a pressure chamber arranged between an inlet valve and an outlet valve. The pressure device 10, 10A is here arranged in the fluid flow downstream of the outlet valve of the piston pump 1, 1A. The pump cylinder 5 in the exemplary embodiment shown is inserted in a receiver bore of a fluid block 3 with corresponding fluid channels 3.1, 3.2. The delay device 20, 20A of the choke device 10, 10A is configured such that in a first operating mode of the piston pump 1, 1A, which is characterized by a higher flow rate and high engine speeds, the static choke point 11 is disabled after a predefined number of pump strokes and is bridged by a bypass formed by the dynamic choke point 12, 12A. Also, the delay device 20, 20A is configured such that in a second operating mode of the piston pump 1, 1A, which is characterized by a lower flow rate and low engine speeds, the static choke point 11 is enabled and causes a pressure-independent choking of the fluid flow.

To be able to achieve as high a flow rate as possible, the initially static choke point 11 is "disabled" as far as possible on each pump stroke. For good NVH performance however, precisely this static choke point 11 is very important for choking the fluid flow at low engine speeds at which noise-critical maneuvers are normally carried out. At low engine speeds, the integrated inertia according to the disclosure does not affect the closing behavior of the choke device 10, 10A. The pump strokes at low engine speeds are too far apart and the dynamic choke point 12 can close despite the integrated inertia. At high engine speeds, if a high flow rate is required, the dynamic choke point 12 can no longer close since the integrated inertia is too high and the dynamic choke point 12 can no longer close in the short time available. In this way, a direct bypass is created and the static choke point 11 is "disabled".

As further evident from FIGS. 1 and 2, in the first exemplary embodiment shown of the choke device 10 according to the disclosure, the delay device 20 comprises a friction element 22 with a lip 22.1 which is arranged between the closing body 16 and an inner wall 14.2 of the pot-like base body 14 and creates a direction-dependent friction. In the first exemplary embodiment shown, the friction element 22 is thus arranged in a receiver 24 in the closing body 16 which is formed as a peripheral groove, such that the lip 22.1 of the friction element 22 is guided on the inner wall 14.2 of the pot-like base body 14. Due to the lip 22.1 formed, the friction element 22 has a lower friction value in the opening direction of the closing body 16 than in the closing direction of the closing body 16. Thus the friction element 22 has a higher friction value in the closing direction than in the opening direction. In an alternative exemplary embodiment not shown, the closing body 16 is configured as a plastic injection molding on which the friction element 22 is directly molded.

As further evident from FIG. 3, in the second exemplary embodiment shown of the choke device 10A according to the disclosure, the delay device 20A comprises a spring element 18A formed as an elastomer spring 22A. The delay in the closing movement of the closing body 16A can be predefined simply by suitable choice of material and/or geometry of the elastomer spring 22A.

Figure 4:
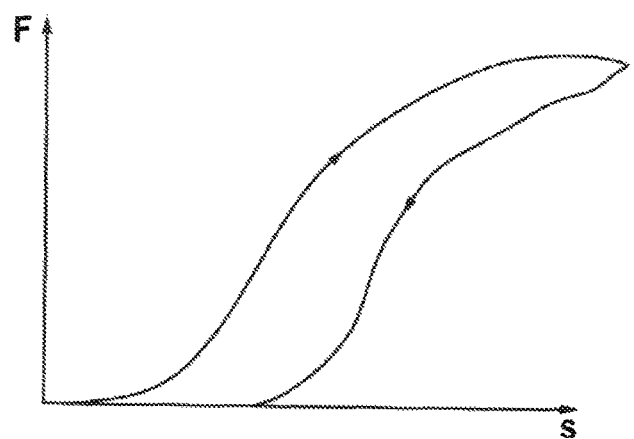
FIG. 4 shows a force-travel curve of a device according to the disclosure for choking a fluid flow from FIG. 1 or FIG. 3.

As further evident from FIG. 4, the integrated friction element 22 in the first exemplary embodiment, or the elastomer spring 22 used in the second exemplary embodiment, causes the depicted hysteresis of the force-travel curve of the choke device 10, 10A according to the disclosure.

Figure 5:
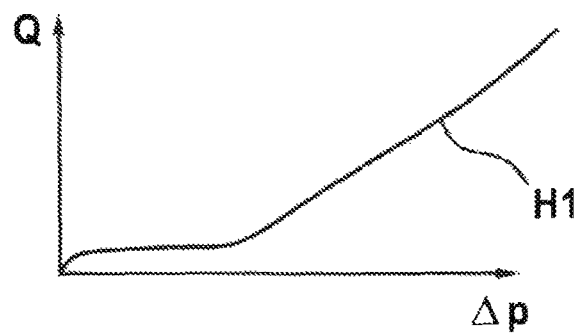
FIG. 5 shows a flow-pressure difference curve of a device according to the disclosure for choking a fluid flow from FIG. 1 or FIG. 3, on the first stroke of the corresponding piston pump.

As further evident from FIG. 5, the first flow-differential pressure curve H1 shown, representing a first pump stroke at high flow rate, has a clear static proportion at lower pressure differences.

Figure 6:
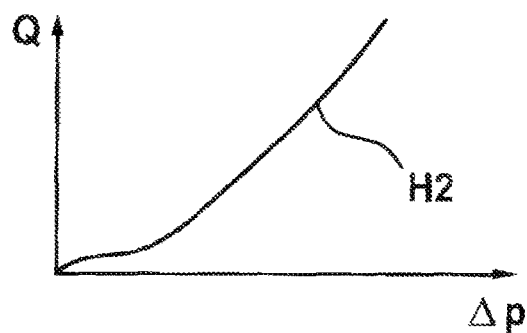
FIG. 6 shows a flow-pressure difference curve of a device according to the disclosure for choking a fluid flow from FIG. 1 or FIG. 3, on a second stroke of the corresponding piston pump.
Figure 7:
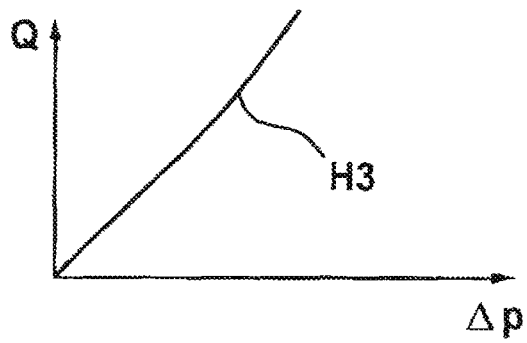
FIG. 7 shows a flow-pressure difference curve of a device according to the disclosure for choking a fluid flow from FIG. 1 or FIG. 3, after the third stroke of the corresponding piston pump.

As further evident from FIG. 6, the second flow-differential pressure curve H2 shown, representing a second pump stroke at high flow rate, has a smaller static proportion at low pressure differences, which has almost completely disappeared in the third flow-differential pressure curve H3 shown in FIG. 7, representing a third pump stroke at high flow rate. The course of the flow-differential pressure curves for subsequent pump strokes corresponds to the course of the third flow-differential pressure curve H3 shown.

What is claimed is:

1. A device for choking a fluid flow, comprising:
a pot-like base body including a base having a first passage opening;
a spring element;
a closing body guided axially moveably in the pot-like base body against a spring force of the spring element and having a second passage opening configured to form a static choke point with a predefined fixed opening cross section;
a delay device configured to delay a closing movement of the closing body in a targeted fashion,
wherein the closing body in combination with the spring element and the first passage opening forms a dynamic choke point with a dynamic opening cross section that is variably adjustable depending on a pressure difference, and
wherein the delay device has a friction element with a lip which is arranged between the closing body and an inner wall of the pot-like base body and creates a direction-dependent friction.

2. The device according to claim 1, wherein the friction element is arranged in a receiver in the closing body or is molded onto the closing body such that the lip of the friction element is guided on the inner wall of the pot-like base body.

3. The device according to claim 2, wherein the friction element has a lower friction value in an opening direction of the closing body and a higher friction value in a closing direction of the closing body.

4. A piston pump for delivering fluids, comprising:
a piston;
a pump cylinder;
a pressure chamber arranged between an inlet valve and an outlet valve; and
a device for choking a fluid flow, the device located downstream of the outlet valve in the fluid flow, the device including (i) a pot-like base body including a base having a first passage opening, (ii) a spring element, (iii) a closing body guided axially moveably in the pot-like base body against a spring force of the spring element and having a second passage opening configured to form a static choke point with a predefined fixed opening cross section, and (iv) a delay device configured to delay a closing movement of the closing body in a targeted fashion,
wherein the closing body in combination with the spring element and the first passage opening forms a dynamic choke point with a dynamic opening cross section that is variably adjustable depending on a pressure difference.

5. The piston pump according to claim 4, wherein the delay device is configured such that in a first operating mode of the piston pump, the static choke point is disabled after a predefined number of pump strokes and bridged by a bypass formed by the dynamic choke point.

6. The piston pump according to claim 5, wherein the delay device is configured such that in a second operating mode, the static choke point is enabled and causes a pressure-independent choking of the fluid flow.

7. The piston pump according to claim 6, wherein the piston pump has a higher flow rate in the first operating mode and a lower flow rate in the second operating mode.

* * * * *